H. VILLIERS-STUART.
PROCESS OF EXTRACTING NICOTIN FROM GREEN OR UNCURED TOBACCO.
APPLICATION FILED MAY 9, 1913.
1,196,184. Patented Aug. 29, 1916.
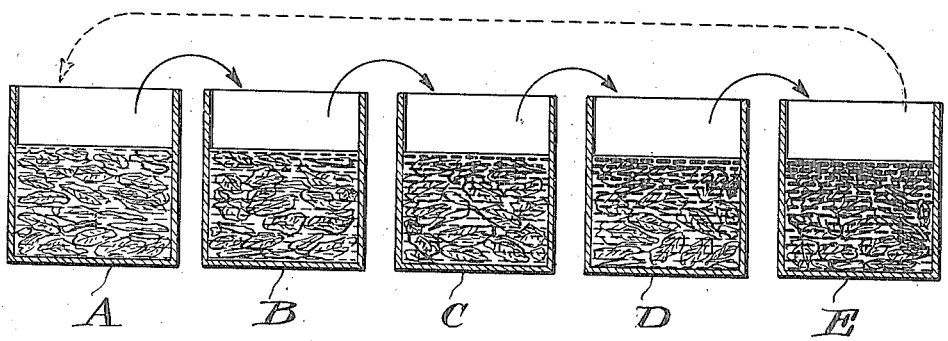
Witnesses
Inventor

UNITED STATES PATENT OFFICE.

HORACE VILLIERS-STUART, OF LISMORE, IRELAND.

PROCESS OF EXTRACTING NICOTIN FROM GREEN OR UNCURED TOBACCO.

1,196,184.   Specification of Letters Patent.   Patented Aug. 29, 1916.

Application filed May 9, 1913.   Serial No. 766,576.

*To all whom it may concern:*

Be it known that I, HORACE VILLIERS-STUART, of Ballyin, Lismore, in the county of Waterford, Ireland, have invented certain new and useful Improvements in Processes of Extracting Nicotin from Green or Uncured Tobacco; and I hereby declare that the following is a full, clear, and exact description thereof.

This invention is a novel process of extracting nicotin from green or uncured tobacco, and its object is to extract the nicotin in such manner that other valuable products may be retained in the tobacco, which after the extraction of the nicotin may be used as a by-product, either by utilizing its fertilizer values or by curing for smoking, or other purposes.

In my invention the nicotin is extracted by dialysis in the following manner: The green or uncured tobacco after being made alkaline is immersed in a liquid in which nicotin is soluble, the nicotin and other crystalloids dialyze through the vegetable membrane of the tobacco into said liquid, or otherwise pass thereinto, and the nicotin is afterward extracted from the liquid in any well known manner.

In carrying out the invention, the nicotin and its salts in solution and other crystalloids contained in the cells of the green or uncured tobacco dialyze through the vegetable membrane thereof until the liquid in which the tobacco is immersed contains approximately the same percentage of crystalloids as the cells of the leaves, while the colloids (resin, gum, and other sticky matters which will not dialyze) remain in the leaves. By extracting nicotin from the liquid the balance of percentage content of nicotin may be prevented, and the maximum quantity of nicotin dialyzes through the vegetable membrane; but as the crystalloids (other than nicotin,) are not removed from said liquid a balance of the percentage content of such crystalloids is soon attained, with the result that only nicotin passes into the liquid; and if further quantities of green or uncured tobacco leaves be placed in such liquid the percentage content of crystalloid matters (other than nicotin) in the liquid and in the leaves will in due time balance so that nicotin only dialyzes into the liquid. It will be obvious therefore that if the nicotin be removed from the liquid such liquid may be used continuously or repeatedly for dialyzing purposes.

The preferred practical method of extracting nicotin from the green or uncured tobacco by this invention consists in providing a number of compartments for containing the green or uncured tobacco, which may be of any desired or suitable kind. For convenience of explanation I have in the accompanying drawings illustrated such an apparatus diagrammatically, the said drawings showing a series of compartments that may be designated "A" to "E" inclusive. These compartments are filled with green or uncured tobacco; then an alkaline solution or hydrocarbon (hereinafter referred to as liquid) in which nicotin is soluble is introduced into compartment A and allowed to remain there (say for instance from 12 to 24 hours) until a convenient percentage of nicotin has dialyzed into the liquid from the green or uncured tobacco leaves. This liquid is then advanced into the next compartment B and allowed to stand and compartment A may be filled with fresh liquid; and after a suitable interval, say 12 to 24 hours, the liquid in compartment B is advanced into compartment C; and the liquid in A advanced into compartment B; and compartment A is filled for the second time with fresh liquid. In this manner the liquid is successively transferred from one compartment to another, after subjecting the green or uncured tobacco therein to dialysis as described, until all the compartments are filled with liquid.

When the green or uncured tobacco is immersed in an alkaline liquid the juice contained within the plant cells is rapidly made alkaline by dialysis and the nicotin and its salts in solution in the plant juice are thereby freed. I therefore have in the green or uncured tobacco in compartments A-E plant juice containing free nicotin separated by exceedingly thin vegetable membranes from the alkaline liquid, with the result that dialysis takes place under ideal conditions.

If the plant or equipment has sufficient compartments then the liquid in the last compartment (say E) by the laws of dialysis should contain approximately the same percentage of nicotin as the green or uncured tobacco itself, and such liquid after it has been withdrawn from compartment E may be treated in any convenient manner for the further concentration of the nicotin; or for the removal of the nicotin; the liquid when free of nicotin being ready for re-use in the compartment A instead of adding fresh liquid (thus retaining all the valuable extracts of the green or uncured tobacco in the liquid.)

When the strong liquid is removed from compartment E the liquid in the preceding compartment, say D, is advanced into compartment E, and so on all the way back, until the compartment A is empty of liquid. The green or uncured tobacco in compartment A, which then has little or no nicotin left in it, may be removed and used as a fertilizer, or cured for smoking purposes, and compartment A filled with fresh green or uncured tobacco.

The solution in compartment E is now advanced to compartment A (which then becomes the strong compartment), the solution in D to E, the solution in C to D, the solution in B to C, and so on until compartment B is emptied. Compartment B is then filled up with the solution that has had the nicotin extracted from it, or if it is not desired to obtain the other constituents of the tobacco, a fresh solution may be added instead. Compartment B now becomes the weakest compartment, and compartment A the strongest. The liquid in compartment A may now be pumped off and treated in any convenient manner for the removal or concentration of the nicotin.

This procedure may be carried on in rotation throughout the several compartments indefinitely. The result is a liquid containing approximately as high a percentage of nicotin as the green or uncured tobacco itself (without concentration of said liquid)· and having no colloids in solution, it is possible to concentrate it down to a product containing a very high percentage of nicotin, far higher than is possible with any tobacco extract obtained by the diffusing system.

The nicotin may be removed from the alkaline solution in the strong cell by passing said solution through a liquid hydrocarbon which will dissolve the nicotin therein but which will not readily mix therewith, and such liquid hydrocarbon may in turn be freed from the nicotin by passing it through acidulated water. In this manner both the solution and the liquid hydrocarbon, being freed of nicotin, may be used repeatedly while the nicotin is accumulated in the acidulated water from which it may be recovered in any well known manner; or if desired the acidulated water may be evaporated down to obtain nicotin sulfate.

If desired the compartment or cell process may be carried out using a hydrocarbon instead of an alkaline solution; but in this case the tobacco must first be made alkaline. The hydrocarbon from the last cell may be then concentrated to obtain free nicotin and the vapors driven off during the concentrating process condensed and used again, or run through acidulated water to produce nicotin sulfate. The extraction process may also be carried out in a single tank the nicotin being constantly removed from the hydrocarbon.

In practice the most suitable alkaline solutions are found to be caustic soda, ammonia, or lime; and when the process is carried out in a single tank only it is found preferable to pump off the alkaline solution in which the green or uncured tobacco is immersed; to dissolve out the nicotin by passing same through liquid hydrocarbon and the hydrocarbon pumped off and freed from nicotin; the solution and the hydrocarbon being subsequently pumped back to their respective tanks. Suitable hydrocarbons for the purpose are petrol, Scotch naphtha and gasolene.

If desired instead of allowing the dialysis to take place in the alkaline solution the green or uncured tobacco leaves may first be dipped in such solution to "free" the nicotin; at first there will be slight dialysis of the nicotin into the alkaline solution, but as the nicotin is not removed such dialysis will cease after the solution becomes charged with nicotin; then the leaves may be immersed in a liquid hydrocarbon into which the nicotin dialyzes and from which the nicotin may be removed as above set forth. A suitable hydrocarbon for this purpose is paraffin oil, or if it is desired to cure the green tobacco after such treatment, one of the highly volatile hydrocarbons should be used.

The leaves contain most of the nicotin in the tobacco plant, and being thin and of large superficial area the vegetable membrane surrounding the plant cells is eminently suitable as a membrane for dialyzing purposes as hereinbefore set forth, and the extraction of nicotin is simplified by this invention, while the other valuable products are retained in the tobacco.

Diffusion cannot be suitably employed, if at all, to extract nicotin from green or uncured tobacco nor can dialysis be suitably employed to extract nicotin from cured or dried tobacco.

The basic principle of the invention is dialysis as applied to green or uncured tobacco—direct—the juices on the interior of the leaf being one liquid and the membranes and fibers of the plant forming a permeable medium interposed between the inner liquids, and the outer dialyzing liquid.

By using the liquid containing the crystalloid elements of the green or uncured tobacco over and over in the compartments, loss of crystalloids is prevented. By this process nothing need be extracted from the green or uncured tobacco except nicotin and all the other values may be retained and the liquid containing all the crystalloid elements may be used in lieu of fresh liquid as a dialyzing agent. The green uncured tobacco may be cured and used for smoking purposes after the nicotin has been extracted from it.

What I claim is:

1. The herein described process of obtaining nicotin, consisting in subjecting green or uncured tobacco to dialysis in a liquid having a greater solvent action for the nicotin than for the crystalloids contained in such tobacco.

2. The herein described process of obtaining nicotin, consisting in subjecting green or uncured tobacco to dialysis in a liquid having a greater solvent action for the nicotin than for the crystalloids contained in such tobacco, and then recovering the nicotin alone from the resulting solution.

3. The herein described process of obtaining nicotin, consisting in subjecting green or uncured tobacco to dialysis to abstract nicotin therefrom; recovering the nicotin from the resulting solution; and reusing the remaining solution as the abstracting agent on other green or uncured tobacco.

4. The process of obtaining nicotin from tobacco, consisting in placing the tobacco in a series of compartments, the tobacco in the different compartments having a varying content of nicotin, subjecting the substantially spent leaves to the action of a liquid having a greater solvent action on the nicotin therein than on the crystalloids contained in such tobacco to completely extract nicotin therefrom, and successively acting upon the tobacco in the other compartments with such liquid in the order of the amount of nicotin contained therein in increased strength, to obtain a full concentration of the nicotin in the liquid.

5. The herein described process of obtaining nicotin, consisting in placing green or uncured tobacco in a series of compartments, subjecting the tobacco in the first compartment to dialysis in a liquid having a greater solvent action for the nicotin than for the crystalloids contained in such tobacco, the resultant solution being introduced successively to the different compartments to increase its nicotin contents; subjecting the substantially spent leaves to the action of fresh liquid, and successively acting upon the tobacco in the other compartments with such liquid in the order of the amount of nicotin contained therein in increased strength, to obtain a full concentration of the nicotin in the liquid, and continuing the process with fresh liquid until substantially all of the nicotin has been abstracted from the leaves.

6. The process of obtaining nicotin from green or uncured tobacco, consisting in placing the tobacco in a series of compartments, the tobacco in the different compartments having a varying content of nicotin, subjecting the substantially spent leaves to the action of a liquid, having a greater solvent action on the nicotin therein than on the crystalloids contained in such tobacco, or to the action of the fresh liquid, to completely extract nicotin therefrom, and successively acting upon the tobacco in the other compartments with such liquid in the order of the amount of nicotin contained therein in increased strength, to obtain a full concentration of the nicotin and thereafter concentrating the liquid.

In testimony that I claim the foregoing as my own, I affix my signature in presence of two witnesses.

HORACE VILLIERS-STUART.

Witnesses:
GEORGE E. CHAMBERLIN,
FLORENCE O. DONGHUE.